US012695781B2

(12) United States Patent
Tzabary et al.

(10) Patent No.: US 12,695,781 B2
(45) Date of Patent: Jul. 28, 2026

(54) TECHNIQUES FOR DETECTING ENDPOINT EXPOSURES IN CLOUD COMPUTING ENVIRONMENTS

(71) Applicant: Wiz, Inc., New York, NY (US)

(72) Inventors: Or Tzabary, Petah Tikva (IL); Ido Yariv, New York, NY (US); Ron David Ben Arzi, Kyoto (JP); Cfir Cohen, Seattle, WA (US)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/972,191

(22) Filed: Dec. 6, 2024

(65) Prior Publication Data

US 2026/0163904 A1      Jun. 11, 2026

(51) Int. Cl.
*H04L 67/10*      (2022.01)
*G06F 11/00*      (2006.01)
*G06F 15/16*      (2006.01)
*H04L 9/40*      (2022.01)
*H04L 15/16*      (2006.01)
*H04L 29/06*      (2006.01)
*H04L 41/0866*      (2022.01)

(52) U.S. Cl.
CPC ...... H04L 63/1433 (2013.01); H04L 41/0866 (2013.01); H04L 67/10 (2013.01)

(58) Field of Classification Search
CPC .. H04L 63/1433; H04L 41/0866; H04L 67/10
USPC ......................................................... 726/25
See application file for complete search history.

(56) References Cited

U.S. PATENT DOCUMENTS

| | | | |
|---|---|---|---|
| 10,250,588 B1* | 4/2019 | Tarafdar .............. | H04L 63/1466 |
| 10,931,648 B2 | 2/2021 | Neal | |
| 11,785,037 B2 | 10/2023 | Yampolskiy et al. | |
| 11,930,032 B2 | 3/2024 | Campbell | |
| 2015/0381515 A1* | 12/2015 | Mattson .................. | H04L 47/83 |
| | | | 707/722 |
| 2016/0140352 A1* | 5/2016 | Nickolov .............. | H04W 12/02 |
| | | | 726/26 |
| 2017/0243004 A1* | 8/2017 | Kinder ................ | H04L 63/1441 |
| 2017/0310703 A1* | 10/2017 | Ackerman .......... | H04L 63/1416 |
| 2018/0091375 A1* | 3/2018 | McClintock ............ | H04L 41/12 |
| 2018/0159887 A1* | 6/2018 | DiGiambattista ..... | G06F 21/577 |
| 2021/0099478 A1* | 4/2021 | Seetharamaiah ... | H04L 63/1433 |
| 2022/0070197 A1* | 3/2022 | Vu ......................... | G06F 21/566 |
| 2022/0210200 A1 | 6/2022 | Crabtree et al. | |

(Continued)

*Primary Examiner* — Berhanu Shitayewoldetsadik
(74) *Attorney, Agent, or Firm* — M&B IP Analysts, LLC

(57)      ABSTRACT

A system and method for detecting endpoint exposures in a cloud computing environment is presented. The method includes detecting a plurality of endpoints in a cloud computing environment, inspecting each of a plurality of resources deployed in the cloud computing environment to detect an endpoint; associating the endpoint to another object, wherein the another object is an entity of the cloud computing environment; generating a representation of the endpoint in a security database, wherein the security database includes a representation of the cloud computing environment; detecting a network path between the another object and an external network; determining that the endpoint is an exposed endpoint in response to detecting the network path; and initiating a remediation action based on the exposed endpoint.

19 Claims, 13 Drawing Sheets

(56) References Cited

U.S. PATENT DOCUMENTS

| 2022/0329616 | A1* | 10/2022 | O'Hearn | ................. | G06F 9/545 |
| 2023/0019180 | A1 | 1/2023 | de Nijs et al. | | |
| 2023/0023584 | A1* | 1/2023 | Sternfeld | ............ | G06F 21/6218 |
| 2023/0308460 | A1* | 9/2023 | Thomas | ................ | H04L 63/102 |
| 2023/0351456 | A1 | 11/2023 | Hogg et al. | | |
| 2023/0370490 | A1* | 11/2023 | Crabtree | ............. | H04L 63/1433 |
| 2024/0317273 | A1* | 9/2024 | Monninger | ..... | B60W 60/00276 |
| 2024/0414190 | A1* | 12/2024 | Lal | ...................... | H04L 63/1416 |
| 2025/0106235 | A1* | 3/2025 | Lakshmanan | ....... | H04L 63/1466 |

* cited by examiner

START

S310

DETECT A VIRTUAL INSTANCE IN A CLOUD
COMPUTING ENVIRONMENT

300

S320

GENERATE AN INSTRUCTION TO CLONE THE
VIRTUAL INSTANCE

S330

INSPECT THE CLONED VIRTUAL INSTANCE
FOR CYBERSECURITY VULNERABILITY

S340

RELEASE THE CLONED VIRTUAL INSTANCE

END

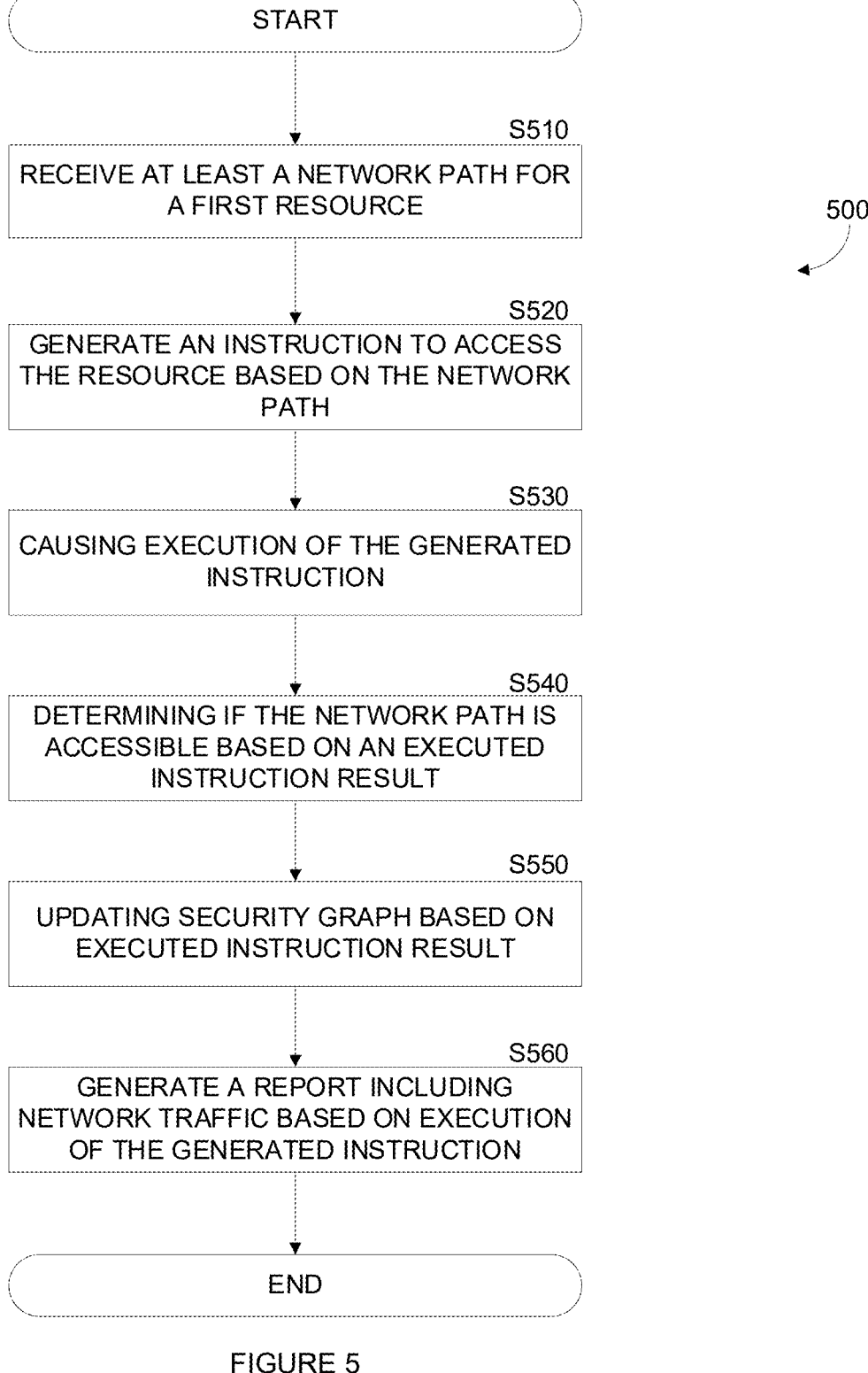

START

S510
RECEIVE AT LEAST A NETWORK PATH FOR
A FIRST RESOURCE

500

S520
GENERATE AN INSTRUCTION TO ACCESS
THE RESOURCE BASED ON THE NETWORK
PATH

S530
CAUSING EXECUTION OF THE GENERATED
INSTRUCTION

S540
DETERMINING IF THE NETWORK PATH IS
ACCESSIBLE BASED ON AN EXECUTED
INSTRUCTION RESULT

S550
UPDATING SECURITY GRAPH BASED ON
EXECUTED INSTRUCTION RESULT

S560
GENERATE A REPORT INCLUDING
NETWORK TRAFFIC BASED ON EXECUTION
OF THE GENERATED INSTRUCTION

END

FIGURE 5

START

S1110                    1100

DETECT AN ENDPOINT

S1120

CORRELATE THE ENDPOINT TO ANOTHER OBJECT

S1130

GENERATE A REPRESENTATION IN A SECURITY
DATABASE

S1140

INITIATE A REMEDIATION ACTION BASED ON A
DETECTED EXPOSURE OF THE ENDPOINT

END

TECHNIQUES FOR DETECTING ENDPOINT EXPOSURES IN CLOUD COMPUTING ENVIRONMENTS

TECHNICAL FIELD

The present disclosure relates generally to the detection of vulnerabilities and exposures in cloud computing environments, and specifically for detecting endpoint exposures in a cloud computing environment.

BACKGROUND

In cloud computing, endpoints are entry points that enable communication between different systems, services, or applications. These are typically URLs or IP addresses used to interact with APIs, web services, or cloud resources, such as storage buckets or databases. Endpoints allow users or systems to access and interact with cloud-hosted resources, often playing a crucial role in enabling cloud services' functionality and integrations.

A significant risk with an exposed endpoint is unauthorized access. If an endpoint is left publicly accessible without proper security measures, such as authentication or encryption, it becomes an easy target for attackers. Malicious actors can exploit exposed endpoints to perform activities like data theft, service disruptions, or injecting malicious commands into cloud systems. For instance, an exposed API endpoint without rate limiting or authentication could be vulnerable to denial-of-service (DoS) attacks or unauthorized data extraction.

Exposed endpoints are difficult to detect due to the dynamic and distributed nature of cloud environments. Organizations often deploy resources rapidly, and as new endpoints are created, they may go undocumented or unmanaged. Shadow IT, misconfigurations, and lack of visibility further complicate the issue, as endpoints may be deployed without the knowledge of security teams. In multi-cloud or hybrid environments, the sheer number of endpoints, combined with inconsistent security controls, amplifies the challenge, leaving organizations vulnerable to potential exploitation.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include detecting a plurality of endpoints in a cloud computing environment. The method may also include inspecting each of a plurality of resources deployed in the cloud computing environment to detect an endpoint. The method may furthermore include associating the endpoint to another object, where the other object is an entity of the cloud computing environment. The method may in addition include generating a representation of the endpoint in a security database, where the security database includes a representation of the cloud computing environment. The method may moreover include detecting a network path between the another object and an external network. The method may also include determining that the endpoint is an exposed endpoint in response to detecting the network path. The method may furthermore include initiating a remediation action based on the exposed endpoint. Other embodiments of this aspect include corresponding computer systems, apparatus, and computer programs recorded on one or more computer storage devices, each configured to perform the actions of the methods.

Implementations may include one or more of the following features. The method may include: detecting the endpoint based on an endpoint definition, where the endpoint definition is detected in a deployed configuration file. The method may include: identifying an endpoint by monitoring any one of, generated by an application deployed in the cloud computing environment: a request, a response, a network communication, and a combination thereof. The method may include: detecting an endpoint based on runtime data received from a runtime sensor including network traffic detected between an executed application and the external network. The method may include: inspecting a code object of an application deployed in the cloud computing environment to detect the endpoint. The method may include: inspecting a configuration file on the detected endpoint to identify objects that are associated with the detected endpoint. The method may include: detecting an endpoint exposure in response to determining that an internal workload in the cloud computing environment is accessible to any one of: an unauthorized user, an unauthorized endpoint, and any combination thereof. The method may include: generating a security graph based on the detected exposed endpoint, where the security graph is stored in the security database. The method may include: inspecting the another object for a cybersecurity object, the cybersecurity object indicating a cybersecurity threat. The method may include: generating a plurality of potential network paths, each potential network path including an exposure between the endpoint and the external network. The method may include: actively inspecting a potential network path of the plurality of potential network paths to determine that the potential network path is a valid network path; and determining that the endpoint is exposed in response to determining that the potential network path is a valid network path. Implementations of the described techniques may include hardware, a method or process, or a computer tangible medium.

In one general aspect, non-transitory computer-readable medium may include one or more instructions that, when executed by one or more processors of a device, cause the device to: detect a plurality of endpoints in a cloud computing environment and inspect each of a plurality of resources deployed in the cloud computing environment to detect an endpoint; associate the endpoint to another object, where the another object is an entity of the cloud computing environment; generate a representation of the endpoint in a security database, where the security database includes a representation of the cloud computing environment; detect a network path between the another object and an external network; determine that the endpoint is an exposed endpoint in response to detecting the network path; and initiate a remediation action based on the exposed endpoint. Other embodiments of this aspect include corresponding computer systems, apparatus, and computer programs recorded on one or more computer storage devices, each configured to perform the actions of the methods.

In one general aspect, a system may include one or more processors configured to: detect a plurality of endpoints in a cloud computing environment. The system may furthermore inspect each of a plurality of resources deployed in the cloud computing environment to detect an endpoint. The system may in addition associate the endpoint to another object, where the another object is an entity of the cloud computing environment. The system may moreover generate a representation of the endpoint in a security database, where the security database includes a representation of the cloud computing environment. The system may also detect a network path between the another object and an external network. The system may furthermore determine that the endpoint is an exposed endpoint in response to detecting the network path. The system may in addition initiate a remediation action based on the exposed endpoint. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: detect the endpoint based on an endpoint definition, where the endpoint definition is detected in a deployed configuration file. The system where the one or more processors are further configured to: identify an endpoint by monitoring any one of, generated by an application deployed in the cloud computing environment: a request, a response, a network communication, and a combination thereof. The system where the one or more processors are further configured to: detect an endpoint based on runtime data received from a runtime sensor including network traffic detected between an executed application and the external network. The system where the one or more processors are further configured to: inspect a code object of an application deployed in the cloud computing environment to detect the endpoint. The system where the one or more processors are further configured to: inspect a configuration file on the detected endpoint to identify objects that are associated with the detected endpoint. The system where the one or more processors are further configured to: detect an endpoint exposure in response to determining that an internal workload in the cloud computing environment is accessible to any one of: an unauthorized user, an unauthorized endpoint, and any combination thereof. The system where the one or more processors are further configured to: generate a security graph based on the detected exposed endpoint, where the security graph is stored in the security database. The system where the one or more processors are further configured to: inspect the another object for a cybersecurity object, the cybersecurity object indicating a cybersecurity threat. The system where the one or more processors are further configured to: generate a plurality of potential network paths, each potential network path including an exposure between the endpoint and the external network. The system where the one or more processors are further configured to: actively inspect a potential network path of the plurality of potential network paths to determine that the potential network path is a valid network path; and determine that the endpoint is exposed in response to determining that the potential network path is a valid network path. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is a flowchart of a method for performing active inspection of a cloud computing environment, implemented in accordance with an embodiment.

DETAILED DESCRIPTION

Figure 1:
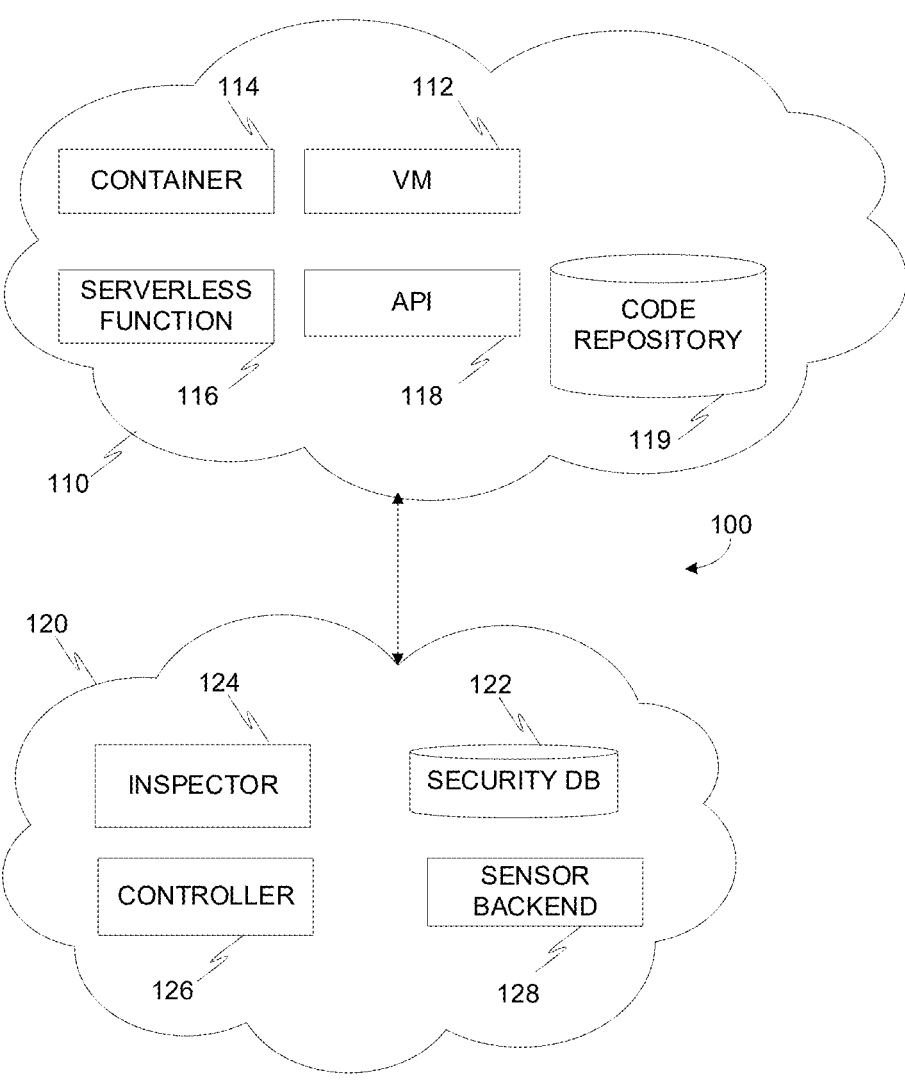
FIG. 1 is a diagram of a cloud computing infrastructure, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for detecting endpoint exposures in a cloud computing environment.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon.

A cloud computing environment 110 is deployed on the cloud computing infrastructure 100. A cloud computing environment 110 may be, for example, a virtual private cloud (VPC) deployed on Azure.

The cloud computing environment 110 includes cloud entities, such as resources and principals. A resource is a cloud entity which supplies functionality, such as processing power, storage, communication, and the like. A resource may supply more than one functionality. Resources may include, for example, virtual machines (VMs), such as VM 112, containers engines such as container engines 114, serverless functions such as serverless functions 116, and the like. As used herein, unless otherwise noted, the terms 'resource', 'virtual instance' and 'workload' are used interchangeably.

The cloud computing environment 110 may further include an application programming interface (API) 118, through which actions in the cloud environment may be triggered, in an embodiment.

In various embodiments, the cloud computing environment 110 includes a code repository 119 which is configured to store code objects, declaration code, configuration files, software images, a combination thereof, and the like. In some embodiments, the code repository is a cloud database which is configured to run in a public computing environment, a hybrid cloud environment, etc., and is managed by a database-as-a-service (DBaaS) in a cloud-based virtual machine (VM).

In various embodiments, the cloud computing environment 110 includes a code repository 119 which is configured to store objects, declaration code, configuration files, software images, a combination thereof, and the like. In some embodiments, the code repository is a cloud database which is configured to run in a public computing environment, a hybrid environment, etc., and is managed by a database-as-a-service (DBAAS) in a cloud-based virtual machine (VM).

A container engine 114 may be implemented using Kubernetes® or Docker®. A serverless function may be implemented using Lambda®. A VM may be implemented using Oracle® VirtualBox, Azure Virtual Machines, and the like.

In an embodiment, an Azure VM is deployed with an operating system (OS) disk, a temporary disk, and at least one data disk. It should be noted that a VM may be deployed with only an OS disk, in some embodiments. The at least one data disk is a managed disk which is attached to the VM and used to store, for example, application data, generated content, and the like. The OS disk includes a preinstalled OS and contains a boot volume. The temporary disk is an optional disk which is not managed, and is used for short-term storage, e.g., for storing a page file, a swap file, and the like.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment, a principal is implemented as a data structure which includes information about an entity, such as username, a password hash, an associated role, and the like.

The cloud computing environment 110 is connected with an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments, a portion of the inspection environment 120 is deployed in the cloud computing environment 110. In some embodiments, certain instances deployed in the inspection environment 120 may be deployed in the cloud computing environment 110.

The inspection environment 120 includes a plurality of inspector workloads, such as inspector 124. The inspector 124 is configured to inspect workloads (i.e., virtual instances) of the cloud computing environment 110. In certain embodiments, an inspector, such as inspector 124, may be configured to inspect other cloud entities, such as user accounts, and the like. In an embodiment, a storage, such as a disk of a virtual machine, may be cloned. As will be discussed below, the cloned disk may be accessed by the inspector 124. The inspector 124 may inspect the cloned disk of the workload for security objects, such as secrets, keys, user account information, and the like. In some embodiments, the inspector 124 inspects the cloned workload for applications, operating systems, binaries, libraries, and the like.

In an embodiment, a cloned disk, which may be a clone of, for example, a data disk, an OS disk, and so on, is generated by generating an instruction, which when executed by the cloud computing environment generates a disk descriptor, based on a virtual instance descriptor (e.g., a VM descriptor). The virtual instance descriptor includes an address where content of the disk is stored. The address may be, for example, an address of a page in a shared storge scheme. The disk descriptor is a data structure which includes therein a data field which includes the original address from the virtual instance descriptor.

A cloned disk is instantly available for inspection, as generating the disk descriptor is an instant operation. In contrast, generating a snapshot requires copying of data, which is only available for inspection once the snapshot generation is complete. Therefore, disk cloning provides faster access to a disk for inspection, and additionally requires less computing resources for such inspection. This is advantageous as the cloning does not disturb a live virtual instance (i.e., a virtual instance deployed in a production environment) while allowing access to a data disk thereof, without requiring cloud resources other than a generation of a cloned disk descriptor. The inspection of a cloned disk is discussed in further detail below.

The inspection environment 120 further includes a security database 122, which is a graph database. A security graph may be stored on the security database 122. The security graph includes a representation of the cloud computing environment 110. For example, cloud entities of the cloud computing environment 110 may be represented each as nodes in the security graph. In an embodiment the security graph is generated based on objects detected by an inspector, such as inspector 124.

In an embodiment, a virtual instance (e.g., a virtual machine) is represented by a node stored in the security graph. A disk, such as OS disk, data disk, and the like, are also represented each by a node, which is connected to the node representing the virtual instance. In certain embodiments, generating an instruction to inspect a virtual instance further includes querying a security graph to determine an identifier of a disk which is connected to the virtual instance, by generating a query to detect a node representing a disk which is connected to another node representing the virtual instance.

A controller 126 is further included in the inspection environment 120. In an embodiment the controller 126 is a workload deployed in the inspection environment 120 which is configured to initiate inspection of the cloud computing environment 110. For example, initiating inspection may include determining what cloud entities to inspect, when to inspect them, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 7 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication. In certain embodiments, the sensor is further configured to send data and receive data from a sensor backend server 128.

The sensor backend server 128 is a workload, such as a virtual machine, software container, serverless function, combination thereof, and the like, which is deployed in the inspection environment 120. In an embodiment, the sensor backend server 128 is configured to receive sensor generated data. For example, the sensor backend server 128 is configured, in an embodiment, to receive events from a sensor.

In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, is checked against a definition. A definition is a logical expression which, when applied to an event, yields a "true" or "false" result.

In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate an inspection of a resource deployed in the cloud computing environment 110. For example, the sensor backend server 128 is configured to initiate an inspection in response to receiving an event, data, a combination thereof, and the like, from a sensor deployed on a resource.

In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied.

As an example, the definition may be "is the IP address in the range of 127.0.0.1 through 127.0.0.99", which in this example corresponds to an IP address range used by a malware, such as a cryptominer. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 is configured to generate an instruction for the inspection controller 126, which when executed by the inspection controller is configured to generate an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat.

For example, the inspector 124 is configured to receive, in an embodiment, a hash of an application stored on the inspectable disk, and is configured to determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

Figure 2:
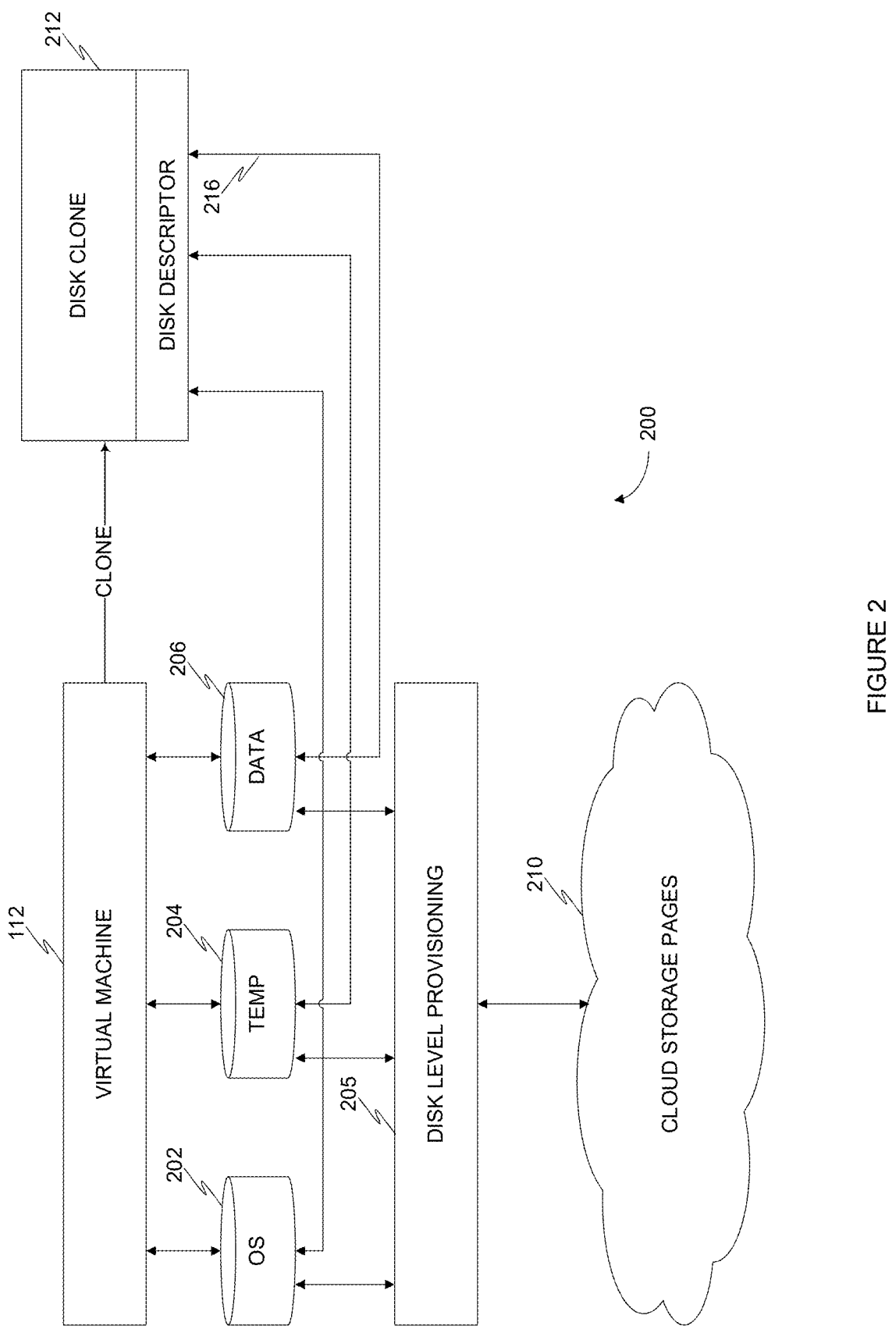
FIG. 2 is a diagram of a virtual machine and a cloned disk thereof, utilized to describe an embodiment.

While the examples above discuss malware and crypto miners, it is readily apparent that the sensor and inspector 124 may be utilized to detect other types of cybersecurity threats, such as an exposure, a vulnerability, a weak password, an exposed password, a misconfiguration, and the like. FIG. 2 is an example diagram 200 of a virtual machine 112 and a cloned disk thereof, utilized to describe an embodiment. While an Azure® cloud computing infrastructure is discussed here, it should be understood that the teachings herein apply equally to other cloud computing infrastructures which offer equal functionality. The VM 112 includes a plurality of disks allocated to the VM 112. The VM 112 may be deployed only with an OS disk, with an OS disk and a plurality of data disks, and so on.

In this example embodiment the plurality of disks includes an operating system (OS) disk 202, an optional temporary disk 204, and at least a data disk 206. The OS disk 202 includes a preinstalled OS, such as Microsoft® Windows, or Linux®. The preinstalled OS is in a boot volume of the OS disk 202. The optional temporary disk 204 may be used for storing temporary data, such as page files, swap files, and the like. The data disk 206 may be used for storing an application, application code, libraries, binaries, application data, and the like. In an embodiment, a plurality of data disks 206 may be allocated to the VM 112. In some configurations, a disk of the plurality of disks may be encrypted. For example, the OS disk 202, and the data disk 206 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 112 by a disk level provisioning 205. In an embodiment, the disk level provisioning 205 is an application deployed in a cloud computing infrastructure. The disk level provisioning 205 provisions hardware resource to the VM 112 which results in allocation of a disk. The hardware resources are provisioned from cloud storage pages 210 of the cloud computing infrastructure. The hardware resources may be solid state device (SSD) storage, hard disk drive (HDD) storage, optical storage, other magnetic storage, and the like. In an example embodiment, the cloud storage pages 210 are Azure page blobs. A page blob is a collection of a pages, each page having a predetermined size. For example, the predetermined size may be 512-bytes per page.

A disk clone 212 (also referred to as cloned disk 212) includes a disk descriptor which includes a reference to an address of a disk of the VM 112. In certain cloud computing infrastructures, when a disk is cloned, a pointer, such as pointer 216 is used to point to an original disk, in this example the data disk 206. In an embodiment, this may be achieved by dereferencing a pointer of the VM 112 which points to the data disk 206, and generating the pointer 216 for the cloned VM 212 to point to the data disk 206. In certain embodiments where a disk is encrypted, a pointer may be generated for the cloned VM 212 to the encryption key.

In an embodiment, the cloning process generates the disk clone 212 as a background process. This is possible due to utilizing diffs. A diff is an additional content that includes the difference between a content at one point in time (e.g., when the original disk was cloned) and a second, later, point in time. Thus, the VM 112 may access the data disk 206 and any diffs generated, or committed, after the disk clone 212 is generated, whereas the disk clone 212 may access only the content of the original data disk 206, and cannot access any diffs generated since.

The cloned disk 212 may then be inspected by an inspector, such as the inspector 124 of the inspection environment 120 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller, such as the controller 126 of FIG. 1, may determine if inspecting a virtual instance requires generating a disk clone or a snapshot. In an embodiment, the determination is performed based on the geographic location of the VM 112, an intended geographic location into which a disk of the VM 112 is cloned, a geographic location of the inspection environment, a number of disks allocated to the virtual instance, or any combination thereof.

By inspecting a cloned disk 212 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 212 is complete, the cloned disk 212 may be spun down, releasing any resources allocated to it, and removing the pointers pointing to the disks of the virtual machine. In an embodiment, the cloned disk 212 may be deleted to accomplish spinning down.

Figure 3:
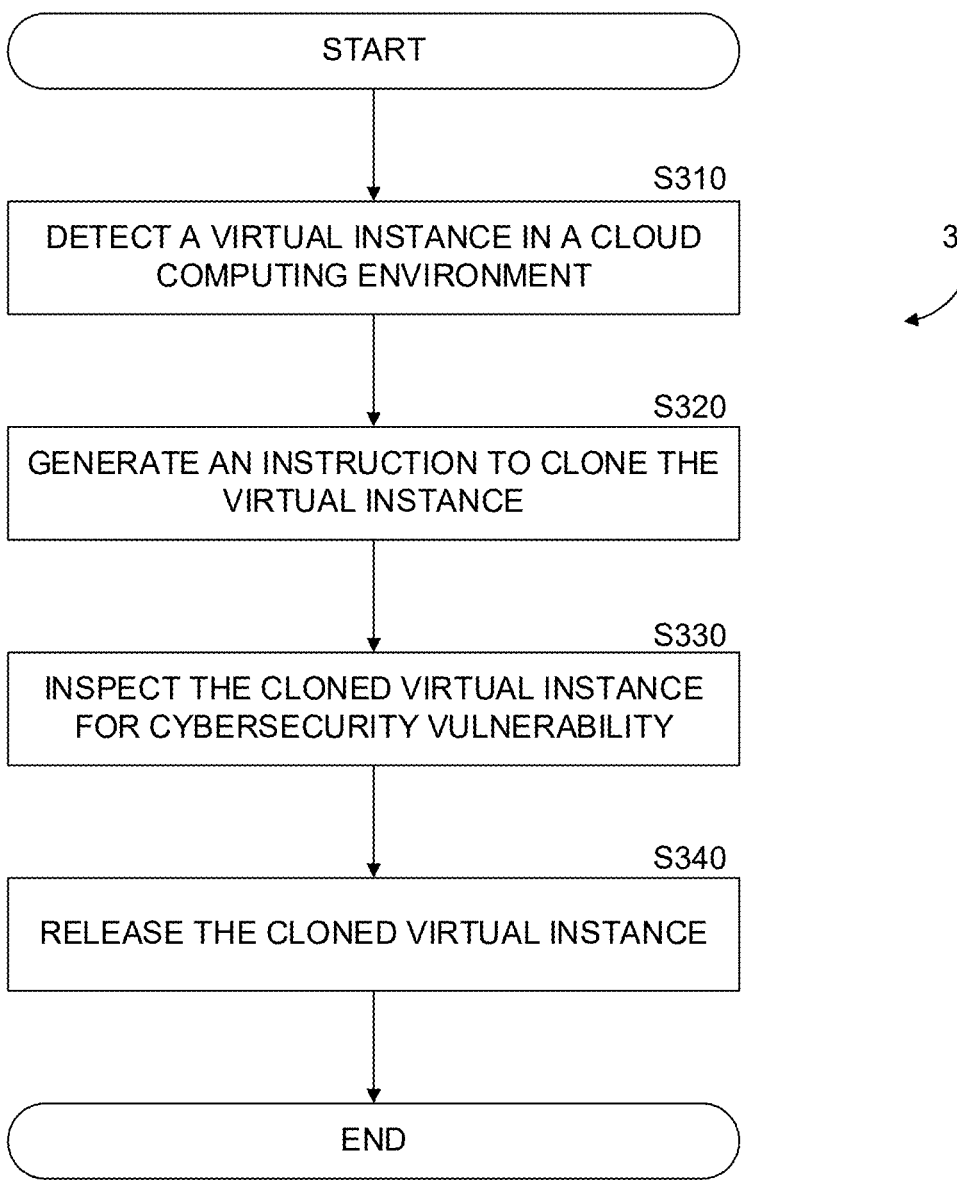
FIG. 3 is a flowchart of a method for generating a disk clone of a virtual instance for vulnerability inspection, according to an embodiment.

FIG. 3 is an example flowchart 300 of a method for generating a disk clone of a virtual instance for vulnerability inspection according to an embodiment.

At S310, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S320, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S330, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S340, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 4:
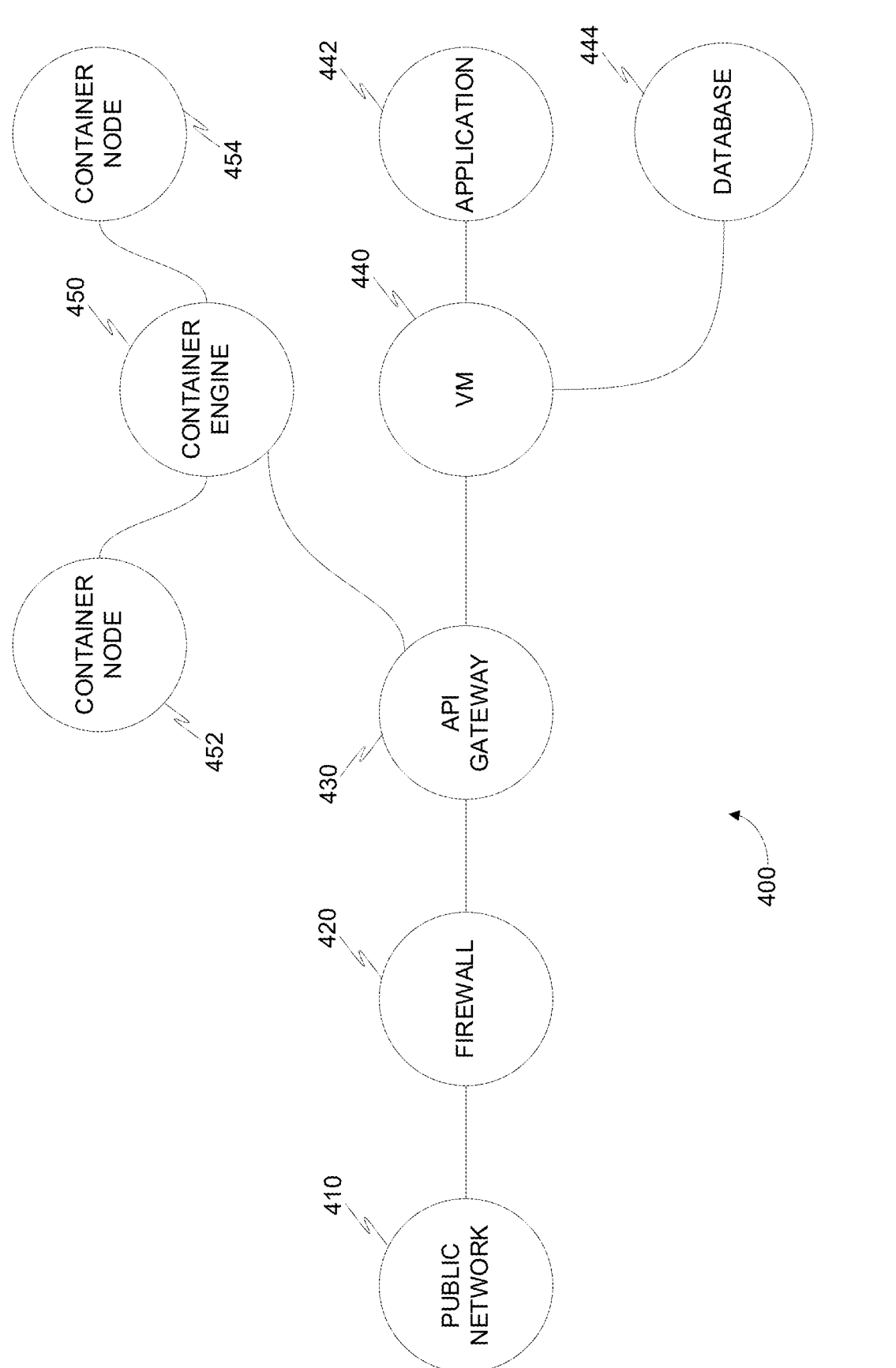
FIG. 4 is a security graph illustrating a network path, implemented in accordance with an embodiment.

FIG. 4 is an example of a security graph 400 illustrating a network path, implemented in accordance with an embodiment. The security graph 400 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 410 (also referred to as public network node 410) represents a public network. An enrichment node, such as enrichment node 410, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 400 may indicate that the resources contain the vulnerability. This allows a compact representation as the security graph does not redundantly store multiple data fields of the same vulnerability in each resource node.

The public network node 410 is connected to a first resource node 420 (also referred to as firewall node 420) representing a firewall workload. The firewall represented by the firewall node 420 may be implemented, for example, as a virtual machine in the first cloud computing environment. Connecting the public network node 410 to the firewall node 420 represents that the firewall is open to transceiving communication between itself and the public network.

The firewall node 420 is further connected to a second resource node 430 (also referred to as API gateway node 430) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 430 is connected to a first principal node 440 (also referred to as VM node 440) representing a virtual machine hosting an application and a database, and is also connected to a second principal node 450 (also referred to as container engine node 450), which hosts a plurality of container nodes 452, 454. The VM node 440 is connected to an application node 442 and a database node 444. The application node 442 may indicate, for example, that a certain application, having a version number, binaries, files, libraries, and the like, is executed on the VM, which is represented by the VM node 440.

In an embodiment, the VM node 440 may be connected to a plurality of application nodes. The database node 444 represents a database which is stored on the VM (represented by VM node 440), or stored on a storage accessible by the VM. The database node 444 may include attributes which define a database, such as type (graph, columnar, distributed, etc.), version number, query language, access policy, and the like.

FIG. 5 is an example flowchart 500 of a method for performing active inspection of a cloud computing environment, implemented in accordance with an embodiment.

At S510, at least one network path for a first resource in a cloud computing environment is received. The network path, also known as object reachability, includes data (e.g. reachability parameters) for accessing the first resource from a public network, which is not the cloud computing environment of the first resource, such as the Internet. In an embodiment, an active inspector may receive the at least a network path, for example from a security graph. In an embodiment, S520 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 6A and 6B below.

At S520, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET /bin HTTP/1.1
Host:10.0.0.127:800 and further generate another HTTP GET request:

GET /bin HTTP/1.1
Host:10.0.0.127:801 and so on, which when executed attempt to access a /bin folder in the resource which has an IP address of 10.0.0.127. In certain embodiments, the active inspector (e.g., the inspector 124 of FIG. 1) may connect to a proxy server (not shown) through a public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S530, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the inspector 124.

At S540, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S550, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S560, a report is generated based on the execution of the generated instruction. In an embodiment, the report may be generated by the inspector, which performs this method. In certain embodiments, generating a report may include updating a log with network traffic between the inspector and the resource. For example, the inspector may record (e.g., write to a log) the generated instruction, the resource identifier, and a response received from the resource. A response may include, for example, a response code. A response code may indicate success, redirection, client error, server error, and the like, where the client is the inspector, and the server is the resource. In certain embodiments the security graph stored in the security DB 122 may be updated based on the determined viability of the network paths. For example, if a resource is successfully accessed, or successfully unaccessed (i.e., an attempt was made to access the resource and the attempt was not successful in accessing the resource), this result can be stored as an attribute of a node representing the resource in the security graph. For example, the VM node 440 of FIG. 4 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the inspector may communicate with a virtual private network (VPN) or a proxy, in order to mask the IP address from which the active inspector is attempting access. This may be useful to test, for example, if a firewall, such as represented by the firewall node 420 of FIG. 4, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an inspector using network paths generated from a security graph is advantageous, as attempting to access resources in this manner to determine the viability of a network path (i.e., reachability) requires less resources than, for example, randomly guessing network paths in an attempt to access resources.

In certain embodiments the inspector may generate a screenshot of a user interface used to access the resource through the network path Furthermore, utilizing the inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

Figure 6A:
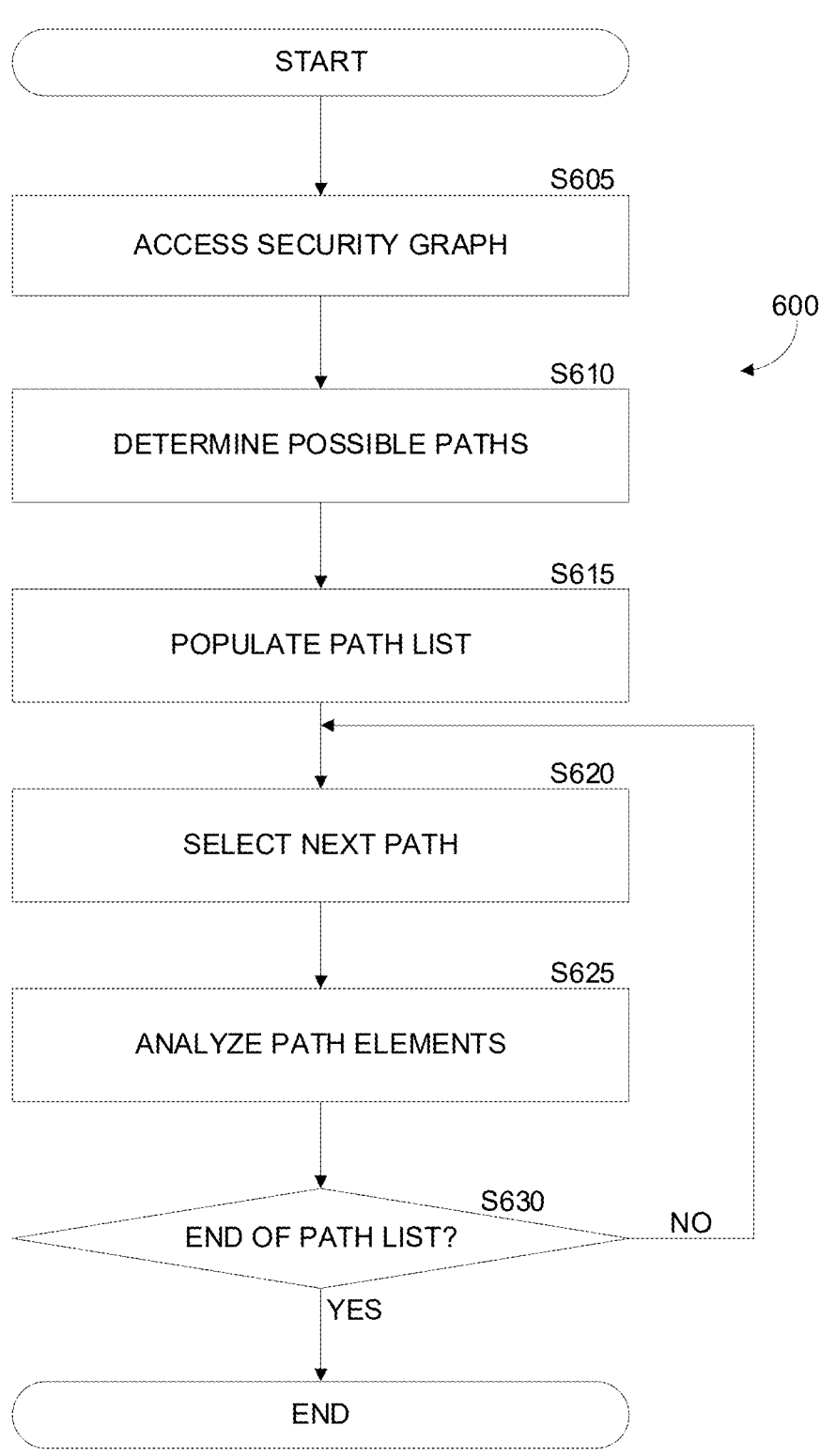
FIG. 6A is a flowchart depicting a method for determining reachable properties of security objects, according to an embodiment.
Figure 6B:
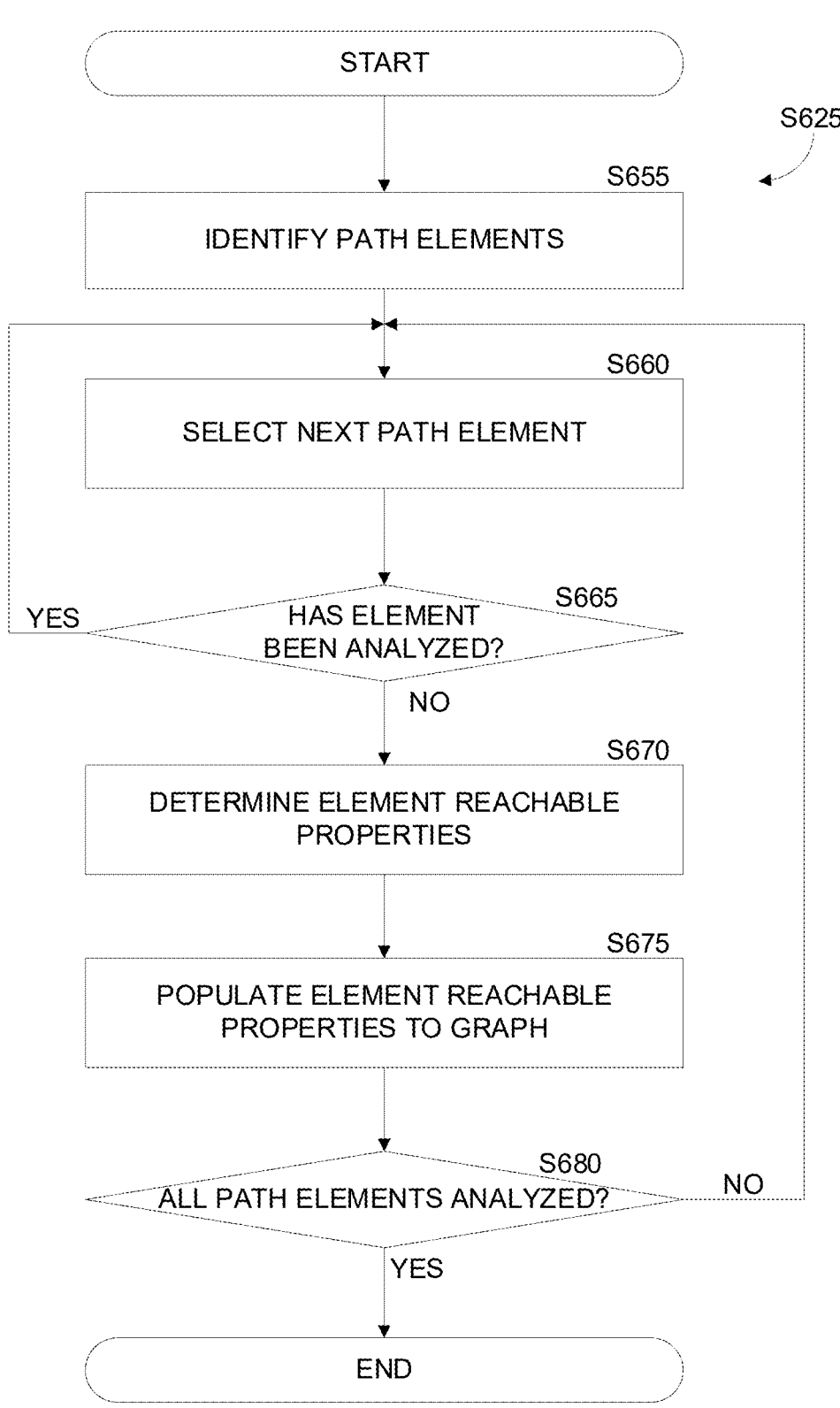
FIG. 6B is a flowchart depicting the analysis of a network path to determine reachable properties of objects included in the path, according to an embodiment.

FIG. 6A is an example flowchart 600 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S605, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S610, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S610 through S630, the list of paths are iteratively identified to determine the reachability properties of the path. Specifically, at S615, a path list is populated to include all identified paths. A path list may be a table, list, or other type of data structure. A path list may be unordered or ordered, including ordering according to one or more path properties.

At S620, a path from the path list is selected. At a first run of the method a first path in the list is selected.

At S625, path elements are analyzed to determine reachable properties. Path element analysis, as at S625, is an iterative analysis of each element included in the path selected at S620. The operation of S625 is discussed in detail with reference to FIG. 6B as follows. At S655, path elements are identified. The next path element is selected in S660. A decision is made in S665 whether the element has been analyzed. If so, the iterative analysis returns to the next element in S660; if not, the operation continues with populating element reachable properties to security graph in S675. In S680, another decision is made whether all path elements have been analyzed. If so, the operation stops; if not, the operation returns to the next element in S660.

At S630, it is determined whether the last path of the path list has been analyzed, and if so, execution terminates; otherwise, execution returns to S620.

Figure 7:
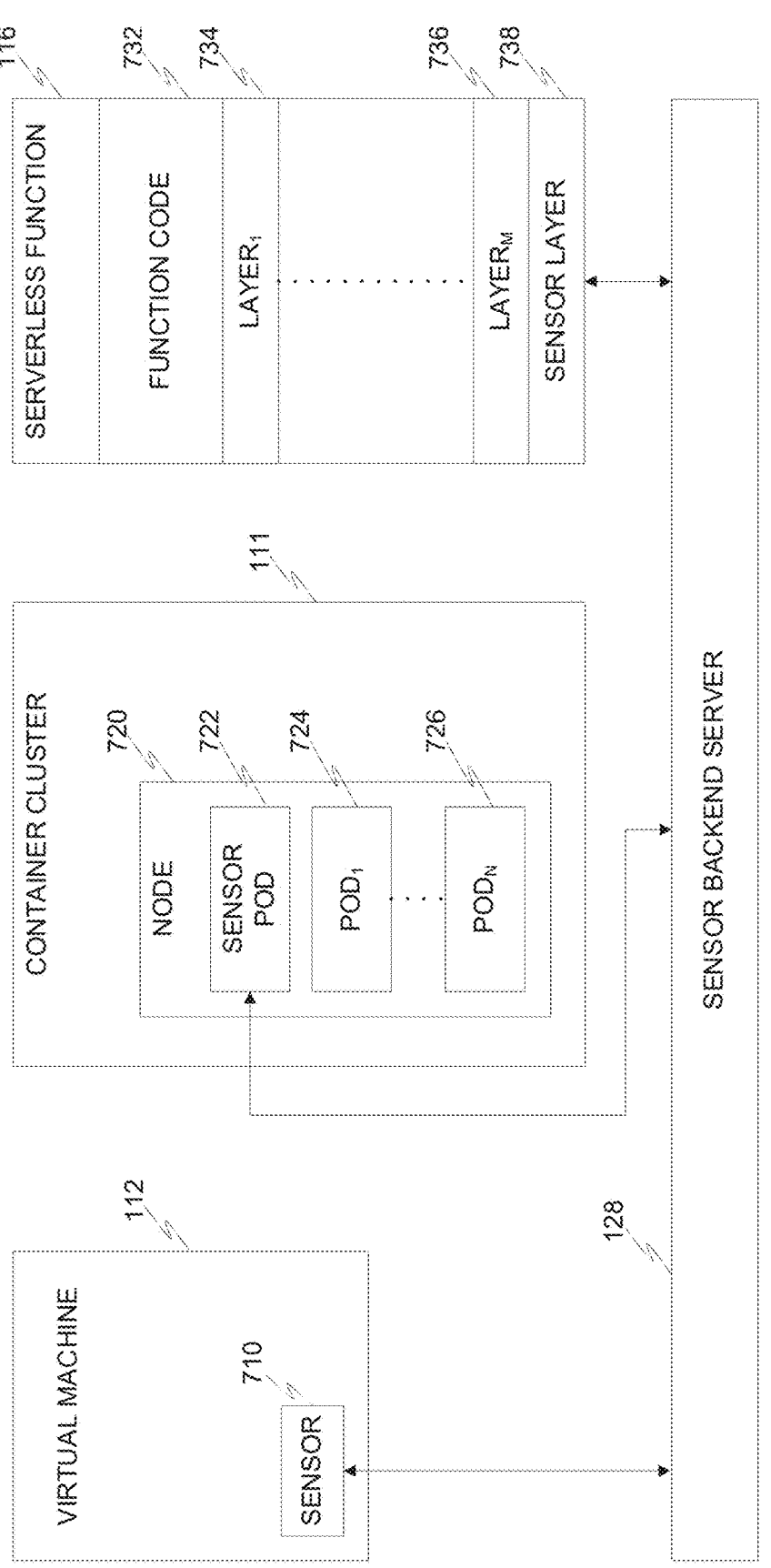
FIG. 7 is a schematic illustration of a sensor backend server communicating with a plurality of sensors deployed on various workloads, implemented in accordance with an embodiment.

FIG. 7 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 710. In an embodiment, the sensor 710 is deployed as a service executed on the virtual machine 112. In some embodiments, a virtual machine 112 is configured to request binary code, a software package, and the like, for example from a sensor backend sever 128, which when executed by the virtual machine 112 cause a sensor 710 to run as a service on the virtual machine 112. The sensor 710 is configured to listen to a data link layer communication, for example through an eBPF interface.

A container cluster 114 runs a daemonset, and includes a plurality of nodes, such as node 720. The daemonset ensures that each node 720 runs a daemonset pod 722, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 724 through pod-N 726, where 'N' is an integer having a value of '1' or greater. The daemonset pod 722 is configured, in an embodiment, to communicate with the sensor backend server 128.

A serverless function 116 includes, in an embodiment, a function code 732, and a plurality of code layers 1 through M (labeled respectively as 734 through 736), where 'M' is an integer having a value of '1' or greater. For example, in AWS Lambda a layer contains, in an embodiment, code, content, a combination thereof, and the like. In some embodiments, a layer, such as layer 734 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 710, daemonset pod 722, and sensor layer 738 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 710, daemonset pod 722, and sensor layer 738 are each configured to communicate with the backend sensor server 128, for example by initiating communication using TCP over the predetermined port.

Figure 8:
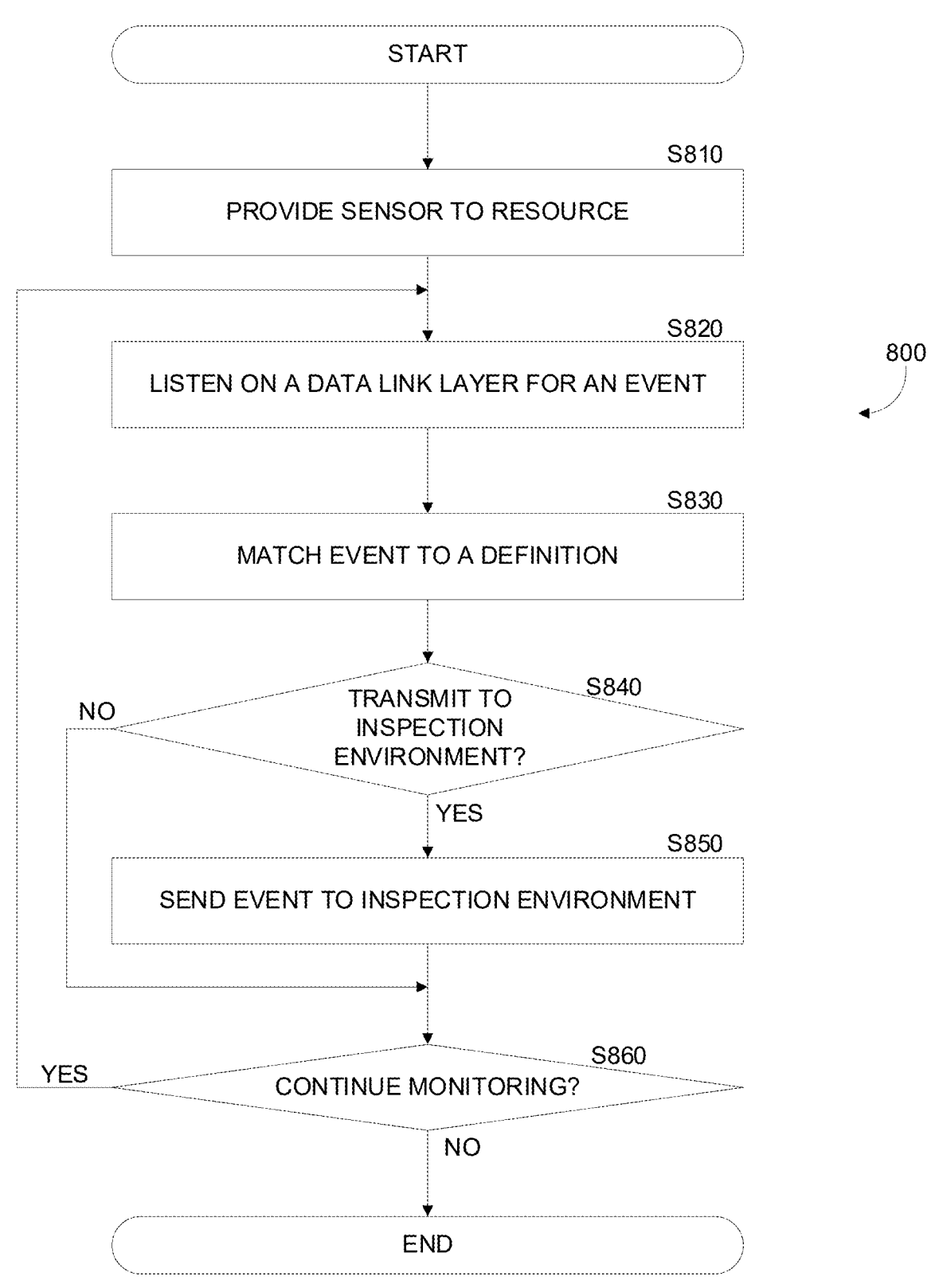
FIG. 8 is a flowchart of a method for performing cybersecurity threat detection on a resource in a cloud computing environment, implemented in accordance with an embodiment.

FIG. 8 is an example flowchart 800 of a method for performing cybersecurity threat detection on a resource in a cloud computing environment, implemented in accordance with an embodiment.

At S810, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S820, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_shal: "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32.so"
        last_seen: 1663138800
    }
    modules {
        path: "/usr/lib/libc-2.32.so"
        last_seen: 1663138800
    }
    modules {
        path: "/usr/lib/libtirpc.so.3.0.0"
        last_seen: 1663138800
    }
    modules {
        path: "/usr/lib/libnss_files-2.32.so"
        last_seen: 1663138800
    }
```

-continued

```
modules {
    path: "/usr/sbin/rpc.mountd"
    last_seen: 1663138800
}
listening_sockets {
    ip_addr: "0.0.0.0"
    port: 60311
}
listening_sockets {
    ip_addr: "0.0.0.0"
    port: 43639
}
```

This portion of an SBOM indicates that a remote procedure call (RPC) is executed, which is configured to receive a client request to mount a file system.

At S830, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S840, a check is performed to determine if data should be transmitted to an inspection environment. In some embodiments, the check is performed by applying a rule to an event, and determining transmission based on an output of applying the rule. If 'yes', execution continues at S850, if 'no' execution continues at S860.

At S850, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S860, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S820. If 'no', in an embodiment execution terminates. In some embodiments, if 'no', another check is performed at S860, for example after a predetermined period of time has lapsed.

Figure 9:
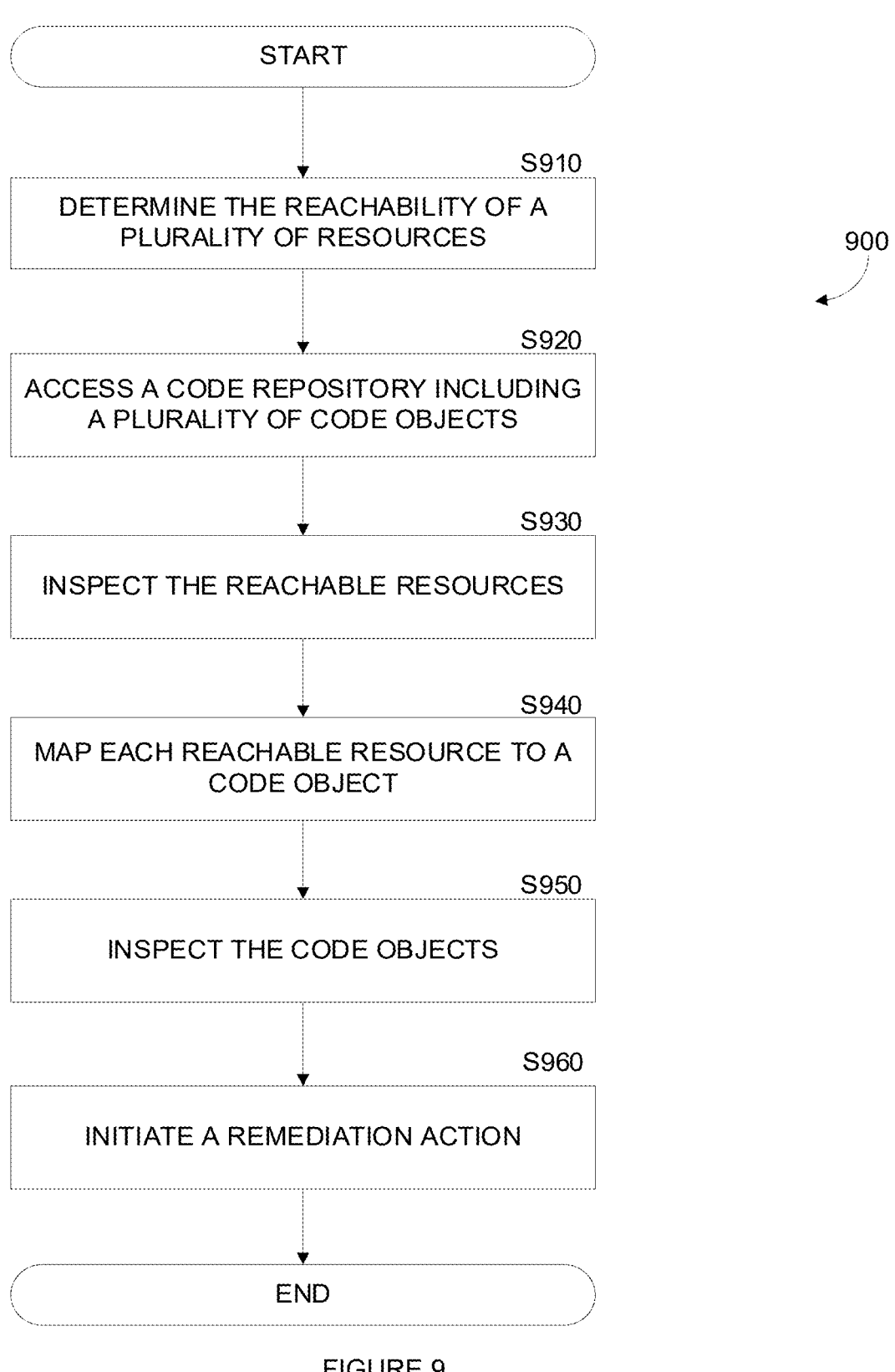
FIG. 9 is a flowchart of a method for performing inspection of a reachable code object, according to an embodiment.

FIG. 9 is a flowchart of a method for performing inspection of a reachable code object, according to an embodiment.

At S910, the reachability of a resource is determined. In some embodiments, reachability is determined for a plurality of resources. In an embodiment, a resource is an entity deployed in the cloud computing environment which supplies functionality such as processing power, memory, storage, communication, a combination thereof and the like. In some embodiments, resources include virtual machines 112, container engines 114, serverless function 116, a combination thereof, and the like.

In some embodiments, various techniques of static analysis are used to determine the reachability parameters of resources deployed in the cloud computing environment. In certain embodiments, such reachability parameters are utilized to generate a network path to the resource from an external network through the cloud computing environment. In an embodiment, a resource is determined to be a reachable if there is an available network path available to access the resource (i.e., a viable path). In certain embodiments, at least a portion of the network path is external to the cloud computing environment.

At S920, a code repository is accessed. In some embodiments, the code repository includes a plurality of code objects. In an embodiment, the code repository includes a version control system (VCS) that is configured to store metadata for a file, a set of files, etc., and is further configured to store a history of changes made to those files.

For example, in an embodiment, the VCS is deployed utilizing Github®. In some embodiments, the code repository 119 is configured to store code objects, declaration code, configuration files, software images, a combination thereof, and the like. In some embodiments, the code repository is a cloud database which is configured to run in a public computing environment, a hybrid cloud environment, etc., and is managed by a database-as-a-service (DBaaS) in a cloud-based virtual machine (VM).

At S930, active inspection is initiated on a reachable resource. In an embodiment, an inspector is configured to trigger an active inspector to inspect the reachable resources to determine if their associated network paths are viable. In certain embodiments, the active inspector is configured to generate an access network instruction based on the network path.

In some embodiments, the active inspector is configured to execute a network access instruction over the network path to determine whether the network path is in fact, a viable path to reach the resource. Once the active inspector determines that the network path is viable, the active inspector is configured to send network data to the inspector, according to an embodiment. In certain embodiments, a representation of a viable network path is stored in a security database.

At S940, each reachable resource is mapped to a code object. In an embodiment, the inspector is configured to receive network data regarding network path viability from the active inspector. In some embodiments, where the network path of a resource is determined to be viable, the inspector is configured to map the reachable resource with a code object.

In an embodiment, the inspector is configured to detect an identifier of the reachable resource (e.g., resource name) and detect an identifier of a code object (e.g., code object name), and store such identifiers in a security database. In various embodiments, the inspector is configured to map the reachable resource with a code object based on their identifiers. For example, in an embodiment, a resource includes a string, alphanumeric identifier, etc., which indicates which code object, software image, etc., is utilized in deploying the resource.

In some embodiments, the inspector is configured to access a state file, for example of an IaC platform, and is further configured to detect a link in the state file between an identifier of a deployed resource, and an identifier of a code object utilized to deploy the resource.

In various embodiments, a code object is a chunk of executable code that is not bound by a function. According to some embodiments, the VCS includes code objects of an IaC platform. In an embodiment, a code object is, for example, a Terraform® code object.

At S950, mapped code objects are inspected. In some embodiments, the active inspector is configured to inspect the code objects to determine if there is a cybersecurity risk. In an embodiment, the inspector is configured to inspect the code objects to detect cybersecurity objects located within the code object.

In various embodiments, the detection of a cybersecurity object in a code object indicates a cybersecurity risk. In an embodiment, a cybersecurity risk includes any one of: a misconfiguration, a vulnerability, an exposure, a malware, a data breach, out of date software, a weak password, a required software update, a combination thereof, and the like.

In some embodiments, a plurality of cybersecurity objects indicate together a cybersecurity issue. For example, in an embodiment, detecting a first cybersecurity object and a second cybersecurity object in a single code object indicate together the presence of a cybersecurity issue, cybersecurity risk, and the like. In certain embodiments, this is also referred to as a toxic combination.

At S960, a remediation action is initiated. In an embodiment, the inspector is configured to initiate a remediation action in response to detecting a cybersecurity risk in the code object. In various embodiments, a remediation action includes any one of: revoking access to a resource, generating new lines of code, generating a new code object, revoking access from a resource, etc., a combination thereof, and the like.

For example, in an embodiment, a new code object is generated by removing the cybersecurity object from the inspected code object, and replacing the inspected code object with the new code object. In some embodiments, remediation further includes detecting resources which are deployed based on the inspected code objects, and replacing the detected resources with new resources.

In certain embodiments, replacing a detected resource includes deprovisioning the detected resource, spinning down the detected resource, etc., and provision a new resource based on the new code object.

Figure 10:
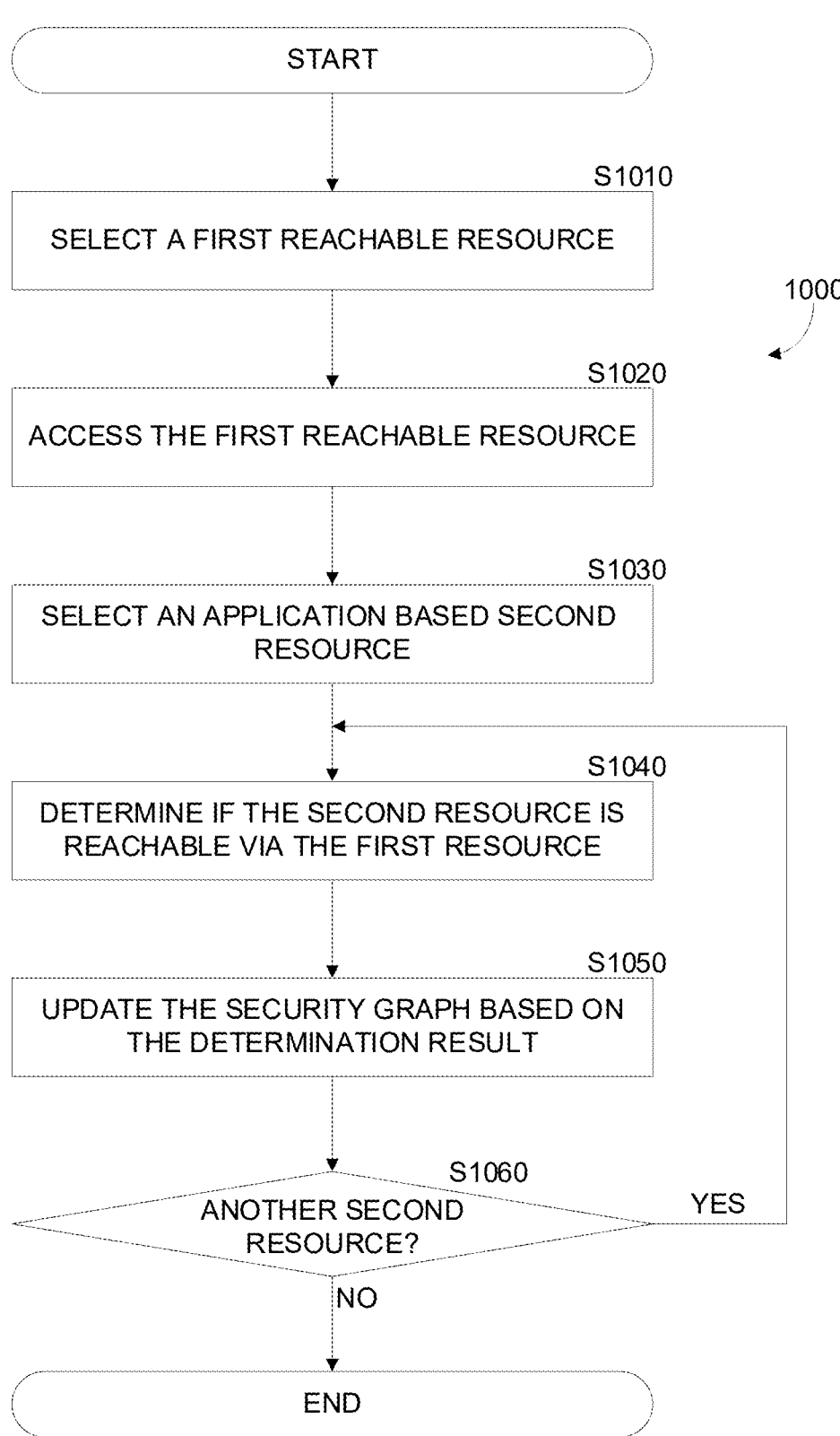
FIG. 10 is a flowchart of a method for detecting application paths, according to an embodiment.

FIG. 10 is an example flowchart 1000 of a method for detecting application paths, according to an embodiment. An application path is a path an attacker may use when gaining access to a cloud computing environment, which includes a first resource through which the attacker gains access to the cloud computing environments, and subsequent second resources which the attacker is able to access in the cloud computing environment, after gaining access to the first resource, wherein the first resource corresponds to a virtual machine, container, and the like, and the second resource corresponds to an application executed (or deployed) on the first resource. In an embodiment, detecting an application path includes detecting a vulnerability which allows to reach a first resource, gain access to it, and through the first resource gain access to a second resource which is accessible to the first resource, but should not be accessible, for example, to the user account or service account accessing the first resource.

At S1010, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S1020, the first resource is accessed. In an embodiment, accessing the first resource includes providing the first resource with credentials which allow access to the first resource. For example, a private key may allow accessing an SSH server. As another example, an API gateway, such as the API gateway 430 of FIG. 4 may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server.

At S1030, a second resource is selected. In an embodiment, the second resource is an application exposed through the first resource. In an embodiment a security graph is queried to determine the second resource. In some embodiments, the cloud computing environment in which the first resource is deployed is represented in the security graph, for example as detailed in FIG. 4 above. In some embodiments, querying the security graph includes causing a query to be executed on a database hosting the security graph, and receiving as a result an identifier of a node which represents a second resource which is connected to the node representing the first resource.

For example, a security graph may be traversed to detect a node representing an application (application node) which is connected to the node representing the first resource. A second network path may be determined, to the application node from the first resource node. For example, the first resource may be accessed by accessing "example.com:80", while the second resource (i.e., application node) is accessed by using an application address, or other listening address. In an embodiment, an application may be predetermined to be listening on an address, port, and the like. The second network path may be generated based on the predetermined listening.

As another example, the application node may indicate that a web server application (second resource) is deployed on a virtual machine (first resource). An access attempt may include generating an access instruction on the first resource (first network path) using port 80 (second network path), which is a predetermined port used for Internet web traffic.

At S1040, the second resource is actively determined to be reachable via the first resource. In an embodiment, a second resource is reachable from the first resource, if the first resource can be used to access the second resource. In the example above, if the web server is reachable through the virtual machine, then the web server is reachable. Thus, if the first resource is a reachable resource, meaning that a network path is found which is viable, and the second resource is accessible from the first resource, then an attacker which gains access to the first resource may also gain access to the second resource. Thus, while the second resource may not have a direct viable network path, it can still become reachable by accessing the first resource, meaning that there is a second network path, which is the network path between the first resource and the second resource. In an embodiment, a resource is accessible if, for example, it can be sent instructions which are then executed by the resource. For example, a SQL database may be determined to be reachable if a network path is determined to a virtual machine hosting the SQL database application, and a second network path allows access to the SQL database (i.e., application path), and further an instruction for performing an SQL injection is generated for execution by the SQL database application.

At optional S1050, a security graph is updated based on the determination. In some embodiments, a node may include an indicator to indicate if a resource is reachable. In other embodiments, an edge may be added between a node representing the first resource and a node representing the second resource, to indicate that the second resource is reachable from the first resource. Actively inspecting second resources in this manner allows to detect certain vulnerabilities in a cloud computing environment, which is of course desirable.

At S1060, a check is performed to determine if another second resource should be checked for reachability from the first resource. In an embodiment execution continues at S1040 if another resource should be checked to determine reachability, otherwise execution terminates. For example, if another application is determined to be deployed on the first resource, e.g., by traversing a security graph and detecting another application node connected to the first resource node, a second application path may be determined and reachability thereto may be determined by performing the method detailed herein.

Figure 11:
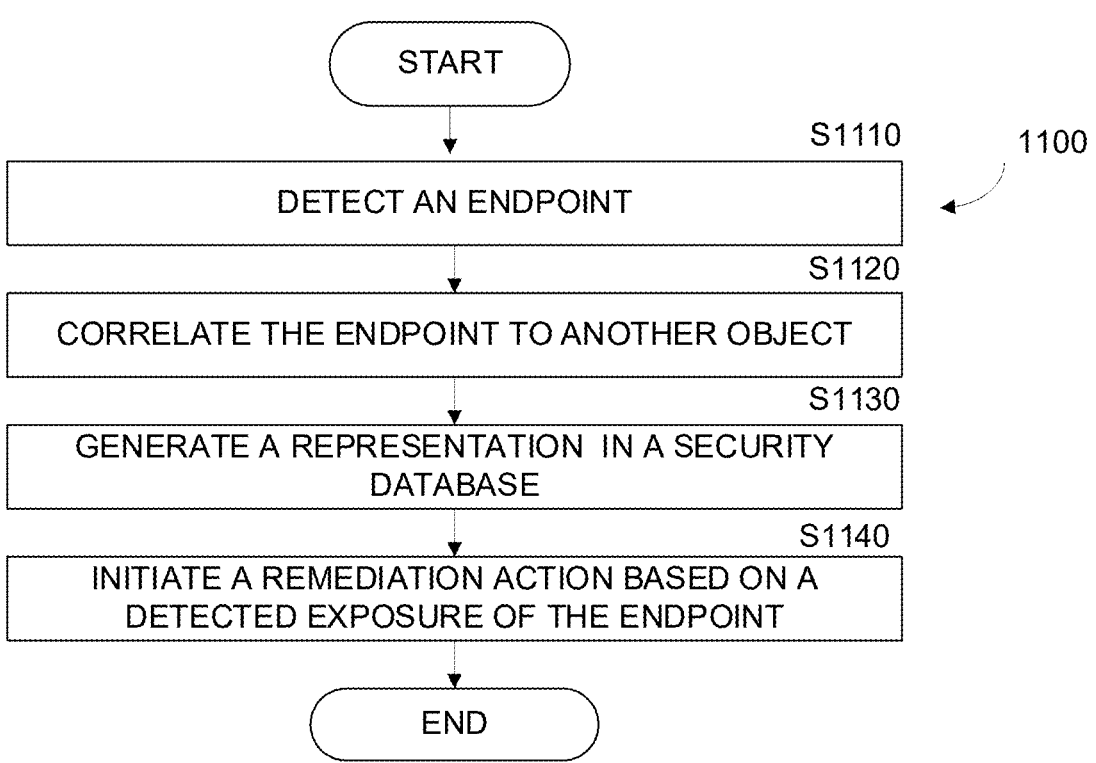
FIG. 11 is a flowchart of a method of detecting an endpoint exposure, according to an embodiment.

FIG. 11 is an example flowchart 1100 of a method for detecting endpoint exposure, implemented in accordance with an embodiment.

At S1110, an endpoint is detected. In an embodiment, an endpoint is a device that communicates back and forth with a network to which it is connected. In various embodiments, an endpoint specifies where resources lie in a network and whether the resources can be accessed. In some embodiments, an endpoint is a specific location within an API that accepts requests and sends back responses. In some embodiments, various systems and applications communicate with each other by sending and receiving information and instructions through an endpoint.

In some embodiments, an endpoint is a single path on an API including a URL to which HTTP requests are posted and from which a response is expected. In an embodiment, an endpoint is a string that includes a domain, a port, a path, a query, etc., a combination thereof and the like. For example, in an embodiment, an endpoint string is "https://mydomain/user/123?format=json".

In an embodiment, an endpoint is detected by utilizing static analysis. For example, in an embodiment, the source code of a deployed application in a virtual machine of a cloud computing environment is parsed to identify patterns within the source code that indicate an endpoint. In certain embodiments, an inspector is configured to detect an endpoint from endpoint definitions within a deployed configuration file. For example, in an embodiment, an inspector is configured to detect a NGINX configuration file of a deployed NGINX application on an inspected volume of a workload.

In various embodiments, an endpoint is detected from dynamic inspection. In certain embodiments, an inspector is configured to monitor applications in a virtual machine to identify endpoints. Specifically, in an embodiment, the inspector is configured to identify endpoints by monitoring requests, responses, and network communication generated by the executed application.

In some embodiments, a runtime sensor is configured to detect endpoints by inspecting network traffic between executed applications on a virtual machine and external resources. For example, in an embodiment, the runtime sensor is configured to detect and monitor HTTP requests and responses from executed applications in order to identify endpoints.

In some embodiments, code analysis is utilized to detect endpoints. In an embodiment, code objects from source code of an executed application in a virtual machine is examined to detect patterns indicating endpoints.

At S1120, the endpoint is correlated to another object. In various embodiments, an object includes any one of a: resource object, code object, software image, workload, a combination thereof, and the like. In some embodiments, active devices, ports, services, applications, a combination thereof and the like, which are running on an endpoint, associated with an endpoint, etc., are identified. In various embodiments, active devices, services, applications, etc. combination thereof, and the like, that are identified are enumerated to identify objects including internal workloads that are hosted by the active devices.

In various embodiments, the detected endpoints are correlated to objects hosted by active devices and running on the endpoint. In certain embodiments, the inspector 124 is configured to inspect configuration files on the detected endpoints to identify objects including internal workloads that are associated with the detected endpoints. In some embodiments, the inspector is configured to inspect an access log to determine which endpoints and users are interacting with internal workloads.

In certain embodiments, the inspector is configured to review permission and access controls to determine if internal workloads are accessible only to authorized endpoints. In some embodiments, where the inspector is configured to determine that an internal workload is accessible to an unauthorized user, an unauthorized endpoint, a security threat, a combination thereof and the like, the inspector is configured to detect an endpoint exposure based on that detection.

At S1130, a representation is generated in a security database. In various embodiments, an inspection environment includes a security database, which is a graph database. In some embodiments, a security graph is stored in the security database. In certain embodiments, the security graph includes a representation of a cloud computing environment. For example, cloud entities of the cloud computing environment are represented each as nodes in the security graph.

In most embodiments the security graph is generated based on objects that are detected by an inspector, such as inspector 124. In various embodiments, the security graph is generated based on endpoint exposures, i.e., exposed endpoints, that are detected by the inspector. In certain embodiments, a representation of endpoint exposures is stored in a security database.

At S1140, a remediation action is initiated based on a detected exposure of the endpoint. In various embodiments, an inspection controller is configured to initiate a remediation action in response to detecting an exposure of an endpoint. In some embodiments, a remediation action includes any one of: revoking access to a workload, revoking access to an endpoint, generating new lines of code, generating a new code object, revoking access from a resource, a combination thereof and the like.

According to an embodiment, the remediation action is initiated on the object which is corelated with the endpoint. In an embodiment, a representation of the endpoint, a representation of the object, and the like, are stored in the security database, for example as nodes in a security graph. In some embodiments, the representation of the endpoint is connected to the representation of the correlated object with an edge, a vertex, and the like, on a graph.

Figure 12:
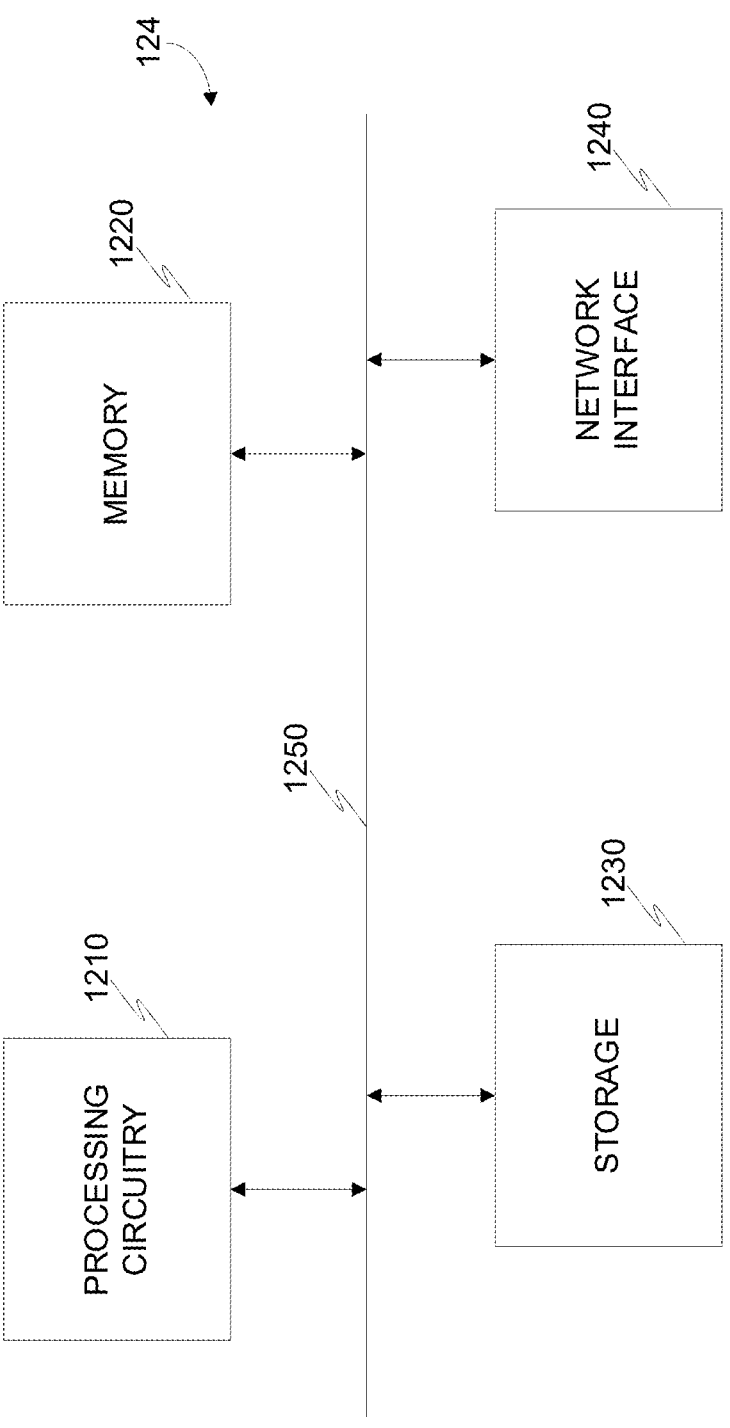
FIG. 12 is a schematic diagram of an inspector according to an embodiment.

FIG. 12 is an example schematic diagram of an inspector 124 according to an embodiment. The inspector 124 includes a processing circuitry 1210 coupled to a memory 1220, a storage 1230, and a network interface 1240. In an embodiment, the components of the inspector 124 may be communicatively connected via a bus 1250.

The processing circuitry 1210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1220 may be volatile (e.g., random access memory, etc.), non-volatile (e.g., read only memory, flash memory, etc.), or a combination thereof.

In one configuration, software for implementing one or more embodiments disclosed herein may be stored in the storage 1230. In another configuration, the memory 1220 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1210, cause the processing circuitry 1210 to perform the various processes described herein.

The storage 1230 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1240 is configured to allow the inspector 124 to communicate with, for example, a cloud environment, a security graph database, resources from the cloud environment, and the like.

It should be understood that the embodiments described herein are not limited to the specific architecture illustrated in FIG. 12, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting endpoint exposures in a cloud computing environment, comprising:

detecting a plurality of endpoints in a cloud computing environment;

associating an endpoint of the plurality of endpoints to an object, wherein the object is an entity of the cloud computing environment;

generating a plurality of potential network paths between the object and an external network, each potential network path including an exposure between the endpoint and the external network;

inspecting a potential network path of the plurality of potential network paths to determine whether the potential network path is valid;

if the potential network path is valid, determining whether the endpoint is exposed; and initiating a remediation action if the endpoint is exposed.

2. The method of claim 1, further comprising:

detecting the endpoint based on an endpoint definition, wherein the endpoint definition is detected in a deployed configuration file.

3. The method of claim 1, further comprising:

identifying the endpoint by monitoring any one of, generated by an application deployed in the cloud computing environment: a request, a response, a network communication, and a combination thereof.

4. The method of claim 1, further comprising:

detecting the endpoint based on runtime data received from a runtime sensor including network traffic detected between an executed application and the external network.

5. The method of claim 1, further comprising:

inspecting a code object of an application deployed in the cloud computing environment to detect the endpoint.

6. The method of claim 1, further comprising:

inspecting a configuration file on the detected endpoint to identify objects that are associated with the detected endpoint.

7. The method of claim 1, further comprising:

detecting the exposure in response to determining that an internal workload in the cloud computing environment is accessible to any one of: an unauthorized user, an unauthorized endpoint, and any combination thereof.

8. The method of claim 1, further comprising:

generating a security graph based on the detected exposed endpoint, wherein the security graph is stored in the security database.

9. The method of claim 1, further comprising:

inspecting the object for a cybersecurity object, the cybersecurity object indicating a cybersecurity threat.

10. A non-transitory computer-readable medium storing a set of instructions for detecting endpoint exposures in a cloud computing environment, the set of instructions comprising:

one or more instructions that, when executed by one or more processors of a device, cause the device to:

detect a plurality of endpoints in a cloud computing environment;

associate an endpoint of the plurality of endpoints to an object, wherein the object is an entity of the cloud computing environment;

generate a plurality of potential network paths between the object and an external network, each potential network path including an exposure between the endpoint and the external network;

inspect a potential network path of the plurality of potential network paths to determine whether the potential network path is valid;

if the potential network path is valid, determine whether the endpoint is exposed; and initiate a remediation action if the endpoint is exposed.

11. A system for detecting endpoint exposures in a cloud computing environment, comprising:

one or more processors configured to:

detect a plurality of endpoints in a cloud computing environment;

associate an endpoint of the plurality of endpoints to an object, wherein the object is an entity of the cloud computing environment;

generate a plurality of potential network paths between the object and an external network, each potential network path including an exposure between the endpoint and the external network;

inspect a potential network path of the plurality of potential network paths to determine whether the potential network path is valid;

if the potential network path is valid, determine whether the endpoint is exposed; and initiate a remediation action if the endpoint is exposed.

12. The system of claim 11, wherein the one or more processors are further configured to:

detect the endpoint based on an endpoint definition, wherein the endpoint definition is detected in a deployed configuration file.

13. The system of claim 11, wherein the one or more processors are further configured to:

identify the endpoint by monitoring any one of, generated by an application deployed in the cloud computing environment:

a request, a response, a network communication, and a combination thereof.

14. The system of claim 11, wherein the one or more processors are further configured to:

detect the endpoint based on runtime data received from a runtime sensor including network traffic detected between an executed application and the external network.

15. The system of claim 11, wherein the one or more processors are further configured to:

inspect a code object of an application deployed in the cloud computing environment to detect the endpoint.

16. The system of claim 11, wherein the one or more processors are further configured to:

inspect a configuration file on the detected endpoint to identify objects that are associated with the detected endpoint.

17. The system of claim 11, wherein the one or more processors are further configured to:

detect the exposure in response to determining that an internal workload in the cloud computing environment is accessible to any one of:

an unauthorized user, an unauthorized endpoint, and any combination thereof.

18. The system of claim 11, wherein the one or more processors are further configured to:

generate a security graph based on the detected exposed endpoint, wherein the security graph is stored in the security database.

19. The system of claim 11, wherein the one or more processors are further configured to:

inspect the object for a cybersecurity object, the cybersecurity object indicating a cybersecurity threat.

* * * * *